United States Patent
Singhal et al.

(10) Patent No.: US 12,130,709 B2
(45) Date of Patent: Oct. 29, 2024

(54) METHOD AND SYSTEM FOR GENERATING AND IMPLEMENTING A DATA PROTECTION STRATEGY USING METADATA

(71) Applicant: Dell Products L.P., Round Rock, TX (US)

(72) Inventors: Upanshu Singhal, Bangalore (IN); Shelesh Chopra, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 204 days.

(21) Appl. No.: 17/721,941

(22) Filed: Apr. 15, 2022

(65) Prior Publication Data
US 2023/0333941 A1    Oct. 19, 2023

(51) Int. Cl.
*G06F 11/14* (2006.01)

(52) U.S. Cl.
CPC ...... *G06F 11/1464* (2013.01); *G06F 11/1451* (2013.01); *G06F 2201/84* (2013.01)

(58) Field of Classification Search
CPC ............. G06F 11/1464; G06F 11/1451; G06F 2201/84; G06F 11/1458
USPC .......................................................... 714/15
See application file for complete search history.

(56) References Cited

U.S. PATENT DOCUMENTS

| 10,621,048 B1* | 4/2020 | Mudgal | G06F 11/1451 |
| 2021/0117282 A1* | 4/2021 | Liu | G06F 11/327 |

OTHER PUBLICATIONS

Wikipedia "backup" page, retrieved from https://en.wikipedia.org/wiki/Backup (Year: 2023).*
Wikipedia "computer network" page, retrieved from https://en.wikipedia.org/wiki/Computer_network (Year: 2024).*

* cited by examiner

*Primary Examiner* — Yair Leibovich
(74) *Attorney, Agent, or Firm* — Chamberlain, Hrdlicka, White, Williams & Aughtry; Aly Z. Dossa (57) ABSTRACT

A method for managing data protection includes: obtaining metadata associated with a backup from a backup storage; performing analysis on the metadata using an analysis engine to generate an analysis result; generating a data protection strategy using the analysis result; and providing the data protection strategy to a production agent.

16 Claims, 4 Drawing Sheets

METHOD AND SYSTEM FOR GENERATING AND IMPLEMENTING A DATA PROTECTION STRATEGY USING METADATA

BACKGROUND

Computing devices may provide services. To provide services, the computing devices may include hardware components and software components. To provide the aforementioned services, the hardware and software components of the computing devices may generate data. The data may be relevant to users (e.g., clients) of the computing devices. The data may be protected to ensure availability to users of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, after being backed up (e.g., through a full backup, an incremental backup, etc.), a client of a computing device may be unaware of a level of protection provided by the backup (e.g., what portion of data is protected, what portion of data is not protected, etc.). In particular, current data protection strategies may be insufficient to perform backups while also providing details about issues that occurred during the backup. Embodiments of the invention relate to methods and systems for generating and implementing a data protection strategy during a backup. More specifically, various embodiments of the invention may obtain metadata associated with a backup from a backup storage. An analysis may be performed on the obtained metadata using an analysis engine to generate an analysis result. A data protection strategy may then be generated using the generated analysis result. Finally, the data protection strategy may be provided to a production agent to perform one or more subsequent backups using the data protection strategy. Such generation of a data protection strategy based on the analysis of the analyzed metadata advantageously provides the client with information about the level of protection afforded by the backup and about any actions (e.g., decreasing a backup window, increasing a capacity of a backup storage, etc.) after the backup has been executed.

The following describes various embodiments of the invention.

Figure 1:
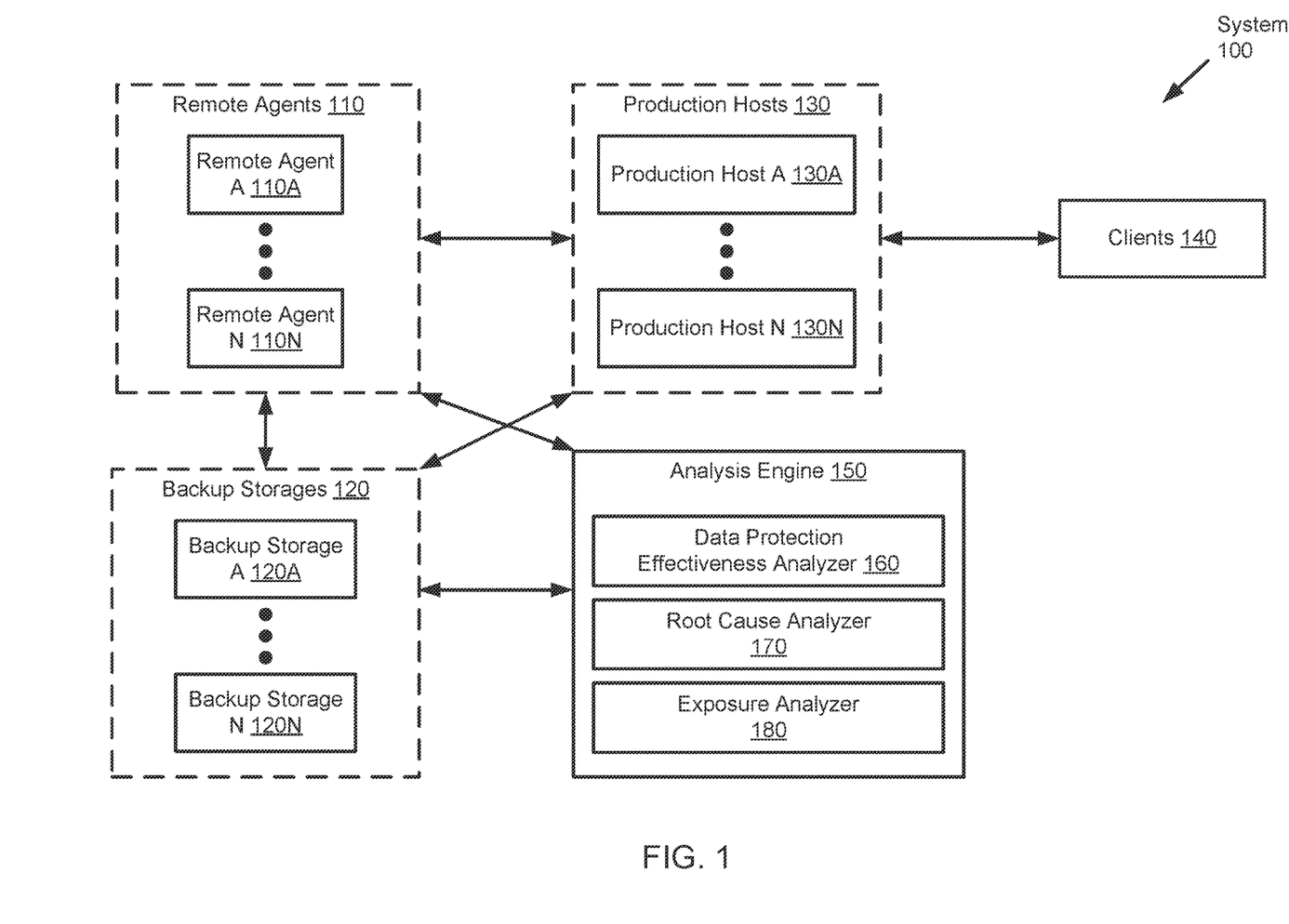
FIG. 1 shows a diagram of a system in accordance with one or more embodiments of the invention.

FIG. 1 shows a diagram of a system (100) in accordance with one or more embodiments of the invention. The system (100) includes remote agents (110), backup storages (120), production hosts (130), clients (140), and an analysis engine (150). The system (100) may include additional, fewer, and/or different components without departing from the scope of the invention. Each component may be operably connected to any of the other component via any combination of wired and/or wireless connections. Each component illustrated in FIG. 1 is discussed below.

In one or more embodiments of the invention, the remote agents (110) may provide backup services to the production hosts (130). The backup services may include generation and storage of backups in the backup storages (120). The backup services may also include restoration (e.g., recovery) of the production hosts (130) using the backups stored in the backup storages (120).

More specifically, the remote agents (110) may provide backup services to the production hosts (130) by orchestrating: (i) generation of backups of the production hosts (130); (ii) storage of the generated backups of the production hosts (130) in the backup storages (120); (iii) consolidation of backup requests to reduce or prevent generation of backups that are not useful for restoration purposes; and (iv) restoration of the production hosts (130) to previous states using backups stored in the backup storages (120). The system (100) may include any number of remote agents (remote agent A (110A), remote agent N (110N)) without departing from the scope of the invention.

Additionally, to provide the aforementioned backup services, the remote agents (110) may include functionality to generate and issue instructions to any component of the system (100) of FIG. 1. In one or more embodiments, the remote agents (110) may also generate instructions in response to backup requests from other entities.

In one or more embodiments of the invention, the remote agents (110) may generate such instructions in accordance with backup schedules that specify when backups are to be generated. In one or more embodiments, a backup schedule may lay out specific points in time for a backup process to be performed. Additionally, these backup schedules may be configured based on a user's recovery point objective (RPO), which is discussed below.

In one or more embodiments of the invention, the time between a data loss event and a most recent backup may be referred to herein as the "RPO." For example, if a user has a 4-hour RPO for an application (e.g., software), then the maximum gap between the data loss event and the most recent backup will be 4-hours. In some scenarios, having a 4-hour RPO may not necessarily mean the user will lose 4 hours' worth of data. For example, a word processing application may go down at 12:35 am and may be restored by 1:10 am. In this case, the user may not have much data to lose.

In another example, a security application may go down at 10:05 am and may not be restored until 1:25 pm. In this case, the user may lose data that is highly valuable to the user. For this reason, the user may set the RPO based on the application priority and may configure the backup schedules accordingly.

Figure 4:
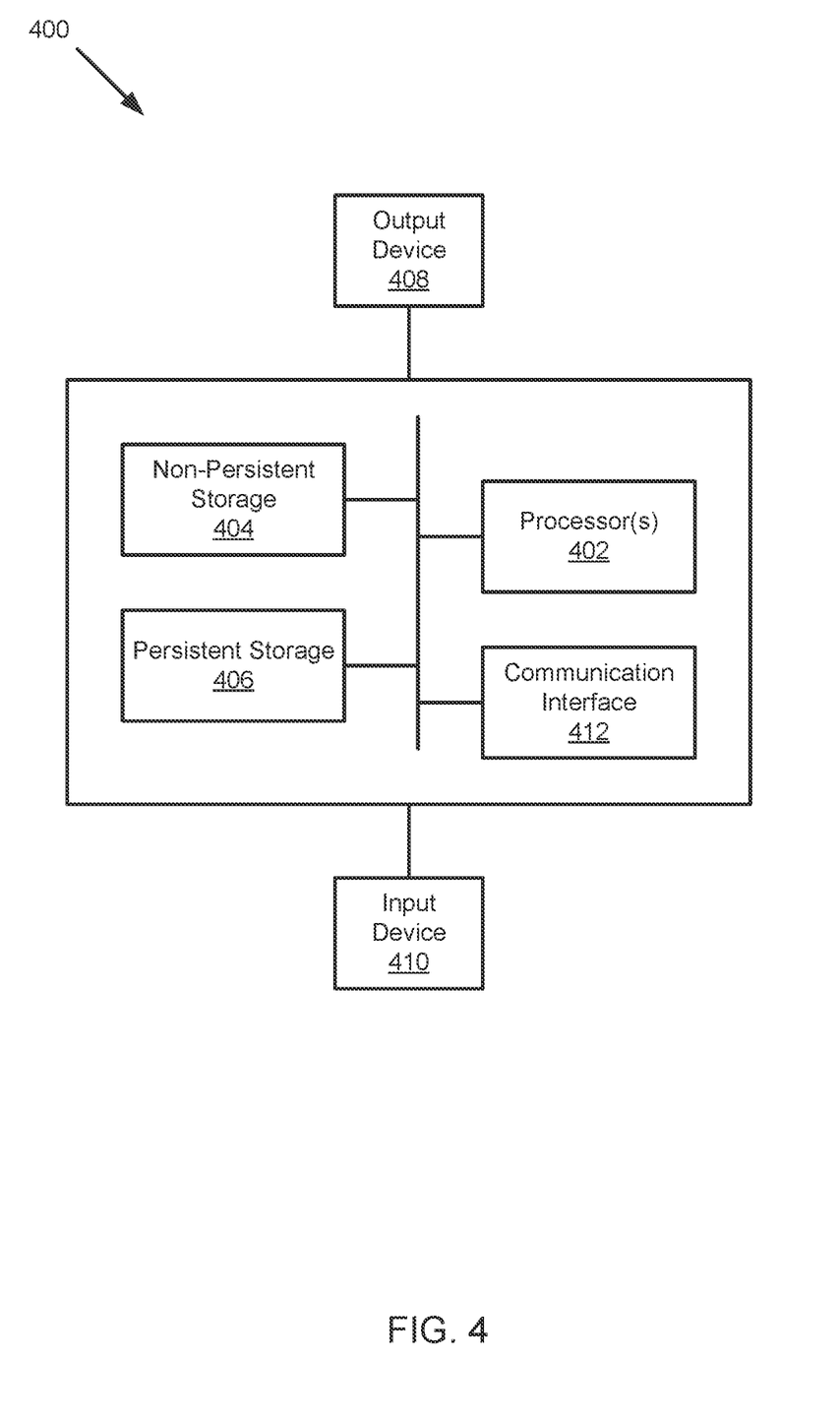
FIG. 4 shows a diagram of a computing device in accordance with one or more embodiments of the invention.

In one or more embodiments of the invention, the remote agents (110) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored on the persistent storage, that when executed by the processor(s) of the computing device, cause the computing device to perform the functionality of the remote agents (110) described throughout this application.

Alternatively, in one or more embodiments of the invention, the remote agents (110) may be implemented as logical devices. A logical device may utilize the computing resources of any number of computing devices to provide the functionality of the remote agents (110) described throughout this application.

In one or more embodiments of the invention, the backup storages (120) may provide data storage services. For example, the backup storages (120) may store backups of the production hosts (130). The backup storages (120) may also provide copies of previously stored backups of the production hosts (130). The system (100) may include any number of backup storages (backup storage A (120A), backup storage N (120N)) without departing from the scope of the invention.

In one or more embodiments of the invention, the backup storages (120) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the backup storages (120) described throughout this application.

Alternatively, in one or more embodiments of the invention, similar to the remote agents (110), the backup storages (120) may also be implemented as logical devices, as discussed above.

In one or more embodiments of the invention, the production hosts (130) may provide services to the clients (140). For example, the production hosts (130) may host any number of applications that provide application services to the clients (140). Application services may include, but are not limited to: database services, electronic communication services, instant messaging services, file storage services, etc.

In one or more embodiments of the invention, each of the production hosts (production host A (130A), production host N (130N)) of the production hosts (130) may provide the above-discussed application services by hosting applications. Each of the production hosts (130A, 130N) of the production hosts (130) may also host any number of applications. Additionally, different production hosts (130A, 130N) of the production hosts (130) may host the same number of applications or different numbers of applications. Different production hosts (130A, 130N) of the production hosts (130) may also host similar or different applications.

In one or more embodiments of the invention, the production hosts (130) may host virtual machines (VMs) (e.g., 210, FIG. 2) that host the above-discussed applications. Each of the production hosts (130A, 130N) of the production hosts (130) may host any number of VMs that, in turn, host any number of applications. Additional details regarding the VMs are described below in reference to FIG. 2.

In one or more embodiments of the invention, the production hosts (130) may perform portions of a backup process (also referred to herein simply as "backup" or "backups"). For example, the production hosts (130) may initiate backups under the direction of the remote agents (110). In one or more embodiments, the production hosts (130) may include functionality to consolidate multiple backup generation requests so that duplicative backups (which may not be useful for restoration purposes) are not generated.

In one or more embodiments of the invention, the production hosts (130) may include functionality to initiate multiple backups in parallel. For example, the production hosts (130) may each host multiple backup processes that each manages the initiation of a respective backup. Each of the multiple backup processes may operate concurrently thereby causing multiple backups to be initiated in parallel.

In one or more embodiments of the invention, the production hosts (130) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the production hosts (130) described throughout this application.

Alternatively, in one or more embodiments of the invention, similar to the remote agents (110), the production hosts (130) may also be implemented as logical devices, as discussed above.

In one or more embodiments of the invention, the clients (140) may interact with the production hosts (130). For example, the clients (140) may utilize application services provided by the production hosts (130). When the clients (140) interact with the production hosts (130), data that is relevant to the clients (140) may be stored on the production hosts (130). For example, consider a scenario in which the production hosts (130) host a database utilized by the clients (140). In this scenario, the database may be a client database associated with the clients (140). When a new client is identified, the clients (140) may add information regarding the new client to the database. By doing so, the data that is relevant to the clients (140) may be stored in the production hosts (130). This may be done because the clients (140) may desire access to the data regarding the new client at some point in time.

In one or more embodiments of the invention, the clients (140) may include functionality to use services provided by the production hosts (130). For example, the clients (140) may host an application that interacts with an application database hosted by the production hosts (130). When an application upgrade is available to fix critical application related issues, a production agent (e.g., 230, FIG. 2) may identify the clients (140) that require the application upgrade. The application database may then provide the application upgrade to the identified clients. By doing so, the application hosted by the identified clients may be kept up-to-date. Additional details regarding the production agent are described below in reference to FIG. 2.

In one or more embodiments of the invention, the clients (140) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the clients (140) described throughout this application.

Alternatively, in one or more embodiments of the invention, similar to the remote agents (110), the clients (140) may also be implemented as logical devices, as discussed above.

In one or more embodiments of the invention, the analysis engine (150) may include a data protection effectiveness analyzer (160), a root cause analyzer (170), and an exposure analyzer (180). The analysis engine (150) may include additional, fewer, and/or different components without departing from the scope of the invention.

In one or more embodiments of the invention, based on a request (e.g., a metadata analysis performance request) received from the remote agents (110), an analysis agent (not shown) of the analysis engine (150) may obtain the metadata specified in the request from an application monitoring module (not shown) and a configuration module (not shown) of the system (100). In one or more embodiments, the obtained metadata may include application metadata and backup metadata. To obtain the metadata, the analysis agent may send an application programming interface (API) call (e.g., a process of an application submitting a request to an API to retrieve the requested data from an external application) to the application monitoring module and the configuration module. Additional details regarding the metadata, the application monitoring module, and the configuration module are described below.

In one or more embodiments of the invention, an API may represent a collection of methods and procedures (e.g., retrieving information about an API source, updating the API source, etc.) that may be executed by one or more applications in a computing system (e.g., 400, FIG. 4). The collection of methods and procedures may be designed and configured to facilitate the analysis agent's access to check the status of and/or manipulate locally or remotely stored analysis results of each of the data protection effectiveness analyzer (160), the root cause analyzer (170), and the exposure analyzer (180). Further, the collection of methods and procedures may include functionality to control remote procedure calls received from the remote agents (110) directed (e.g., instructed) to accessing the locally or remotely stored analysis results.

In one or more embodiments of the invention, the analysis agent may monitor the status (e.g., a currently active or completed status) of analyses performed by the data protection effectiveness analyzer (160), the root cause analyzer (170), and the exposure analyzer (180) such as a data protection effectiveness analysis, a root cause analysis, and an exposure analysis (which are discussed below) through an API call. For example, to be able to monitor the status of each of these analyses, the analysis agent may make an API call to each of the analyzers discussed above to obtain the status from each of the analyzers. The obtained status(es) may then be submitted to the analysis agent.

In one or more embodiments of the invention, the application monitoring module may provide information services (e.g., obtaining, storing, and transferring information) to the analysis agent via a monitoring agent (not shown) of the application monitoring module. Alternatively, the information services provided by the monitoring agent may be provided by the production agent (e.g., see 230 of FIG. 2 discussed below) of one of the production hosts (130A, 130N) of the production hosts (130).

In one or more embodiments of the invention, to provide the information services to the analysis agent, the monitoring agent may obtain information (e.g., application metadata) from, for example: application databases of the production hosts (130), VMs executing on the production hosts (130), volumes (e.g., logical drives) of the production hosts (130), etc.

In one or more embodiments of the invention, the application metadata obtained by the monitoring agent may include, but it is not limited to: the number of application databases, size of each application database, the number of VMs, configuration details (e.g., the number of SSDs, size of each SSD, etc.) of each of the VMs, a type of the applications (e.g., a word processor, a media player, a web browser, an image editor, etc.) hosted by each of the VMs, the number of volumes, size of each volume, type of the file system (e.g., virtual machine file system (VMFS), new technology file system (NTFS), etc.) of each volume, etc.

In one or more embodiments of the invention, a file system may be a method in which an operating system (OS) uses to control how data is named, stored, and retrieved. For example, once a client has logged into a computing device (e.g., 400, FIG. 4), the OS of that computing device uses the file system of that computing device to retrieve one or more applications to start performing one or more operations (e.g., functions, tasks, activities, etc.).

In one or more embodiments of the invention, the application monitoring module may include persistent storage, in which all or some of the obtained application metadata may be temporarily or permanently stored. The persistent storage may be a physical computer readable storage medium. For example, the persistent storage may be (or may include) hard disk drives, SSDs, tape drives, or other physical storage media. The persistent storage may be other types of digital storage not listed above without departing from the scope of the invention. Additionally, the persistent storage may be a virtualized storage without departing from the scope of the invention.

In one or more embodiments of the invention, upon receiving an API call from the analysis agent, the monitoring agent may transfer the obtained application metadata to the analysis agent. Alternatively, the monitoring agent may store the obtained application metadata in the backup storages (120), in which all or some the application metadata may be temporarily or permanently stored. In one or more embodiments, upon receiving an API call from the analysis agent, the monitoring agent may send a request (e.g., an application metadata transfer request) to the backup storages (120) for transferring the application metadata to the analysis agent.

In one or more embodiments of the invention, the application monitoring module may be implemented in hardware (i.e., circuitry), software, or any combination thereof. The application monitoring module may be included in the remote agents (110), the production hosts (130), or the clients (140).

In one or more embodiments of the invention, the configuration module may enable the clients (140) to configure the VMs of the production hosts (130) before performing a backup. The configuration module may also enable the clients (140) to orchestrate the backup services provided by the remote agents (110).

In one or more embodiments of the invention, the clients (140) may send instructions (via the configuration module) to the production agent (e.g., 230, FIG. 2) to configure the VMs. More specifically, the production agent (e.g., 230, FIG. 2) may configure the VMs under the direction of the clients (140). In one or more embodiments, the instructions may include, for example: instructions for configuring a backup policy (e.g., the RPO), instructions for taking a snapshot (e.g., a point-in-time copy of data) of the data (e.g., VM data) on the production hosts (130), etc.

In one or more embodiments of the invention, the clients (140) may send a request (e.g., a backup metadata transfer request) to the remote agents (110). In response to the request, the remote agents (110) may be instructed to transfer backup metadata to the configuration module. In one or more embodiments, the backup metadata may include, but is not limited to: a size of the VM data that is backed-up or recovered, a location (e.g., the backup storages (120), persistent storage (e.g., 240, FIG. 2), etc.) of the backed-up VM data, a status of the backup, etc.

In one or more embodiments of the invention, the remote agents (110) may obtain a status of the backup from the backup storages (120). The status of the backup may specify information such as: (i) whether the backup was successful and whether the backup was completed within a backup window (e.g., 100% of the backup was completed); or (ii) whether the backup was unsuccessful and how much of the backup was not completed within the backup window (e.g., 70% of the backup was completed and 30% of the backup was not completed). In one or more embodiments, the backup window may be a period of time, with a definite start and end, within which a backup is set to be completed.

In one or more embodiments of the invention, the backup storages (120) may include a backup monitoring service for monitoring the status of the backup. The backup monitoring service may represent a computer program that may execute on the underlying hardware of the backup storages (120). Specifically, the backup monitoring service may be designed and configured to facilitate remote access to check the status of and/or manipulate locally stored data during the backup. Further, the backup monitoring service may include functionality to control remote procedure calls (e.g., the API calls) directed to accessing and manipulating any granularity of the locally stored data during the backup.

In one or more embodiments of the invention, upon receiving an API call from the analysis agent, the configuration module may transfer the obtained backup metadata to the analysis agent.

In one or more embodiments of the invention, the configuration module may be implemented in hardware (i.e., circuitry), software, or any combination thereof. The configuration module may be included in the clients (140).

In one or more embodiments of the invention, before initiating (e.g., instantiating, executing, etc.) any one of the above-discussed analyses (e.g., the data protection effectiveness analysis, the root cause analysis, and the exposure analysis) on the transferred application metadata and backup metadata, the analysis agent may obtain additional details regarding the transferred backup metadata. To obtain the additional details, the analysis agent may send another API call to the backup storages (120). In return, the backup storages (120) may send the additional details, including but not limited to: a time required to recover (e.g., a recovery window) the VM data, a time required for taking the snapshot of the VM data, a number of application databases that are backed-up, a number of volumes that are backed-up, a source type of the VM data (e.g., a database, a volume, a network attached storage (NAS) array, etc.), etc.

In one or more embodiments of the invention, the NAS array may refer to a collection of one or more physical storage devices, in which various forms of digital data may be consolidated. Each physical storage device may include non-transitory computer readable storage media, in which the digital data may be stored in whole or in part, and temporarily or permanently.

In one or more embodiments of the invention, each physical storage device may be designed and configured based on a common or different storage technology—examples of which may include, but are not limited to: flash based storage devices, fibre-channel (FC) based storage devices, serial advanced technology attachment (SATA) storage devices, etc.

In one or more embodiments of the invention, upon receiving the metadata, the analysis agent may initiate the analyses by providing the metadata to the data protection effectiveness analyzer (160), the root cause analyzer (170), and the exposure analyzer (180). Each of these analyzers is described in more detail below.

In one or more embodiments of the invention, upon receiving the requested metadata from the analysis agent, the data protection effectiveness analyzer (160) may perform the data protection effectiveness analysis. In one or more embodiments, the metadata may indicate that one or more of the clients (140) were running a full backup with a weekly backup schedule and an incremental backup (e.g., a backup type that only backups data that has been changed since the last backup) with a daily backup schedule.

In one or more embodiments of the invention, the data protection effectiveness analysis may include, but it is not limited to: determining the VM data (e.g., an OS disc image (ISO file), VM templates, picture files, video files, etc.) associated with the full backup that does not change (e.g., static), determining a data change rate of data changes (e.g., writing data, deleting data, etc.) in the application databases, generating a data protection effectiveness analysis result (discussed below) regarding the performed analysis, providing one or more recommendations (also discussed below) based on the generated analysis result, etc.

In one or more embodiments, the generated data protection effectiveness analysis result may include, for example, but is not limited to: results specifying that video files located in volume C:\ are static, results specifying that a data change rate in the application databases is high such that performing an incremental backup every 6 hours is not sufficient, results specifying that a data change rate in the application databases is low such that performing an incremental backup every 6 hours is not necessary, etc.

In one or more embodiments of the invention, the one or more recommendations may include, but they are not limited to: recommendations for moving the static VM data associated with the full backup to an archive location (e.g., a cloud resource) to increase capacity of the backup storages (120), recommendations for decreasing the backup schedule of the incremental backup from every day to every 3 hours because of high data change rate in the application databases, recommendations for increasing the backup schedule of the full backup from every week to every month because of low data change rate in the application databases, etc.

In one or more embodiments of the invention, the data protection effectiveness analyzer (160) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the data protection effectiveness analyzer (160) described throughout this application.

Alternatively, in one or more embodiments of the invention, similar to the remote agents (110), the data protection effectiveness analyzer (160) may also be implemented as logical devices, as discussed above.

In one or more embodiments of the invention, upon receiving the requested metadata from the analysis agent, the root cause analyzer (170) may perform the root cause analysis. In one or more embodiments, the root cause analysis may include a pre-protection process or a post-protection process. As a pre-protection process, the root cause analysis may verify whether the VM data is accessible. For this purpose, the root cause analyzer (170) may check whether, for example: the associated VMs are accessible, the required privileges (e.g., authorization or permission to read data from the associated VMs) are obtained, the backup storages (120) have sufficient capacity to store the VM data, etc.

In one or more embodiments of the invention, the root cause analysis may perform the post-protection process when the backup or the recovery was unsuccessful. As a post-protection process, the root cause analysis may determine, for example: that a portion of the VM data is not backed-up (e.g., not-protected), that there are errors related to the backup or the recovery, whether a backup window was exceeded during the backup, etc. In one or more embodiments, the errors related to the backup or the recovery may include, but they are not limited to: application-based errors (e.g., an application database was not responding), production hosts (130) related errors (e.g., one or more production host (130A, 130N) of the production hosts (130) were not able to execute the API), environmental hazard-related errors (e.g., the backup storages (120) were not accessible because of fire in a data center), etc.

In one or more embodiments of the invention, following the pre-protection process and/or the post-protection process, the root cause analyzer (170) may generate a root cause analysis result. The root cause analysis result may include, but is not limited to: results specifying that a production host (130A, 130N) of the production hosts (130) was not reachable due to intermittent network connection problems, results specifying that the application databases were not responding because of a privilege issue, results specifying that the application databases were not responding because of a temporary database corruption, etc. The intermittent network connection problems may include, but are not limited to: a corresponding network protocol (e.g., a transmission control protocol (TCP), a user datagram protocol (UDP), etc.) being down, a session of a network connection timing out, etc. The temporary database corruption may be, but is not limited to: accidental changes (e.g., deletion, rewriting, addition, etc.) in the application files.

In one or more embodiments of the invention, based on the generated root cause analysis result, the root cause analyzer (170) may also provide one or more recommendations such as, but not limited to: recommendations for modifying the backup window, recommendations for obtaining the required privileges, recommendations for retrying to establish the network connection, etc.

In one or more embodiments of the invention, the root cause analyzer (170) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the root cause analyzer (170) described throughout this application.

Alternatively, in one or more embodiments of the invention, similar to the remote agents (110), the root cause analyzer (170) may also be implemented as logical devices, as discussed above.

In one or more embodiments of the invention, upon receiving the requested metadata from the analysis agent, the exposure analyzer (180) may perform the exposure analysis. In one or more embodiments, the exposure analysis may include, but is not limited to: determining how much of the VM data is backed-up (e.g., not exposed) and how much of the VM data is not backed-up (e.g., exposed), determining whether the backup storages (120) have enough copies of the protected VM data in case of a failure (e.g., an environmental hazard in a data center), generating an exposure analysis result (discussed below) regarding the performed analysis, providing one or more recommendations based (also discussed below) on the generated analysis result, etc.

In one or more embodiments of the invention, the generated exposure analysis result may include, but is not limited to: results specifying that a portion of the VM data that is exposed, results specifying an impact of not protecting that portion of the VM data to the clients (140), results specifying an immediate usability of that portion of the VM data after a recovery, results specifying data being added (or modified) to a portion of the VM data that is not exposed, etc.

In one or more embodiments of the invention, the one or more recommendations may include, but are not limited to: recommendations for increasing the capacity of the backup storages (120), recommendations for modifying the backup schedule(s) to protect a portion of the VM data that is exposed, recommendations for modifying the RPO, etc.

In one or more embodiments of the invention, to determine how much of the VM data is not backed-up, the exposure analyzer (180) may compare the application metadata with the backup metadata. For example, the backup metadata may indicate that all of the VM data is backed-up and the application metadata may indicate that not all of the VM data is backed-up. In one or more embodiments of the invention, the application metadata may indicate that not all of the VM data is protected if: (i) the VM data that is being used by an application is not protected; (ii) the application databases are protected but the transaction log files (e.g., a log file including all operations performed on a database) of the application databases are not protected; and (iii) the application databases are protected but the volumes of the production hosts (130) related to the applications are not protected.

In one or more embodiments of the invention, the exposure analyzer (180) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the exposure analyzer (180) described throughout this application.

Alternatively, in one or more embodiments of the invention, similar to the remote agents (110), the exposure analyzer (180) may also be implemented as logical devices, as discussed above.

In one or more embodiments of the invention, the status of each of the data protection effectiveness analysis, the root cause analysis, and the exposure analysis may be displayed on a graphical user interface (GUI). In one or more embodiments, the clients (140) may then be notified about the status of each of the analyses via the GUI.

In one or more embodiments of the invention, the GUI may be displayed on a display of the computing device (e.g., 400, FIG. 4) using functionalities of a display engine (not shown), in which the display engine is operatively connected to the computing device. The display engine may be implemented using hardware, software, or any combination thereof. The status of each of the data protection effectiveness analysis, the root cause analysis, and the exposure analysis may be displayed in any visual format that would allow the clients (140) to easily comprehend (e.g., read and parse) the listed information.

In one or more embodiments of the invention, the analysis engine (150) may be implemented as a computing device (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the analysis engine (150) described throughout this application.

Alternatively, in one or more embodiments of the invention, similar to the remote agents (110), the analysis engine (150) may also be implemented as logical devices, as discussed above.

Figure 2:
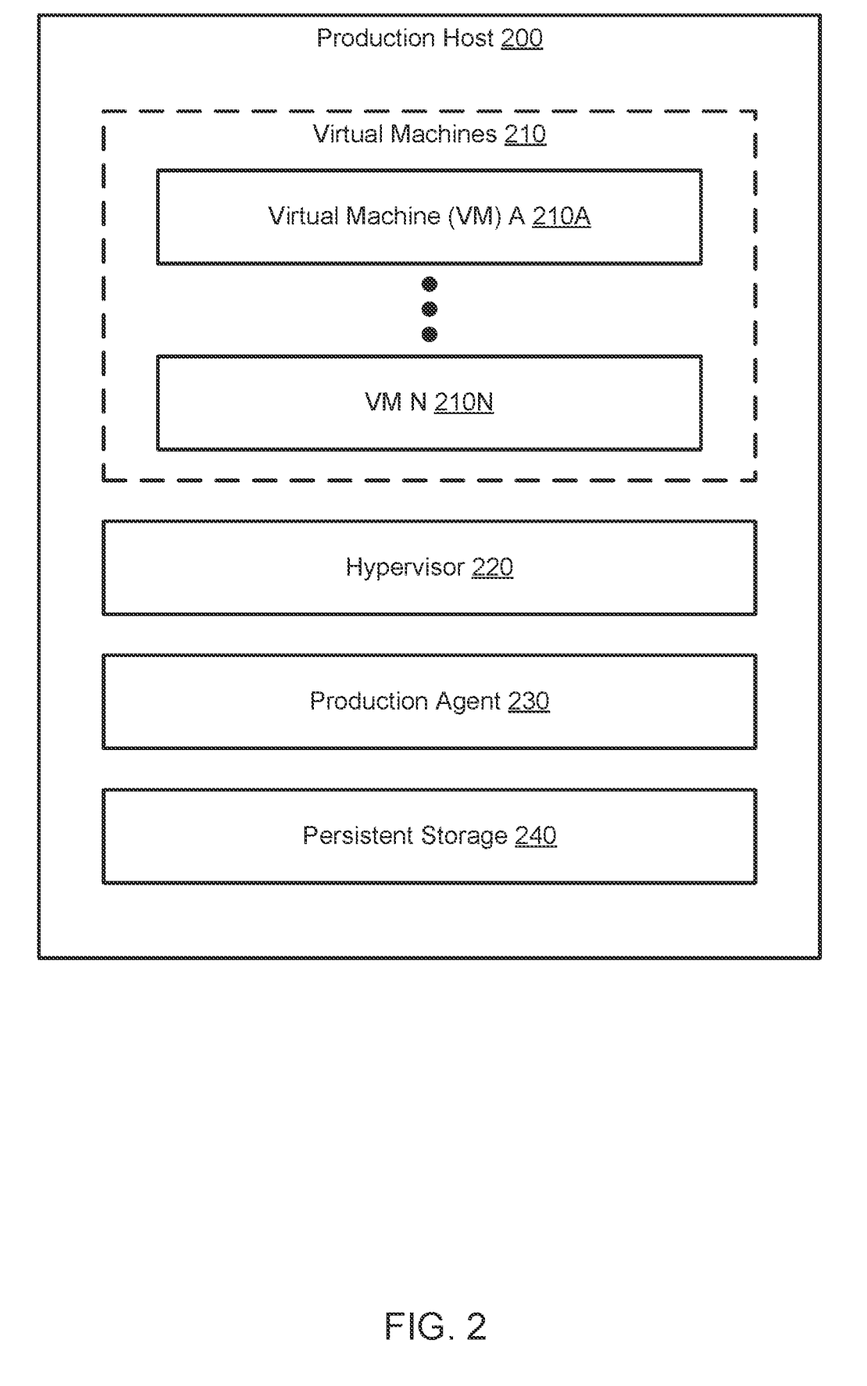
FIG. 2 shows a diagram of a production host in accordance with one or more embodiments of the invention.

Turning now to FIG. 2, FIG. 2 shows a diagram of a production host in accordance with one or more embodiments of the invention. The production host (200) may be any one of the production hosts (130) discussed above in reference to FIG. 1. The production host (200) may include VMs (210), a hypervisor (220), a production agent (230), and persistent storage (240). The production host (200) may include additional, fewer, and/or different components without departing from scope of the invention. Each component may be operably connected to any of the other component via any combination of wired and/or wireless connections. Each component illustrated in FIG. 2 is discussed below.

In one or more embodiments of the invention, the VMs (210) may be logical entities executed using computing resources of the production host (200) or using computing resources of other computing devices (e.g., mobile phones, tablet computers, laptop computers, desktop computers, servers, distributed computing systems, cloud resources, etc.) connected to the production host (200). Each of the VMs (VM A (210A), VM N (210N)) may be performing similar or different processes.

In one or more embodiments, the VMs (210) (and applications hosted by the VMs) may generate the VM data that is stored in the persistent storage (240). In one or more embodiments, the VM data may reflect the state of a VM (210).

In one or more embodiments of the invention, the VMs (210) may provide services to the clients (e.g., 140, FIG. 1). For example, the VMs (210) may host instances of databases, email servers, or other applications that are accessible to the clients (e.g., 140, FIG. 1). The VMs (210) may host other types of applications not listed above without departing from the scope of the invention. Additionally, the applications hosted by the VMs (210) may provide application services to the clients (e.g., 140, FIG. 1).

In one or more of embodiments of the invention, the VMs (210) may be implemented as computer instructions, e.g., computer code, stored on the persistent storage (240) that when executed by a processor of the production host (200) cause the production host (200) to provide the functionality of the VMs (210) described throughout the application.

In one or more embodiments of the invention, the hypervisor (220) may be configured to orchestrate the operation of the VMs (210) by allocating computing resources (e.g., central processing unit (CPU), memory, etc.) to each of the VMs (210).

In one or more embodiments of the invention, the hypervisor (220) may be a physical device including circuitry. The physical device may be, but it is not limited to: a field-programmable gate array (FPGA), an application-specific integrated circuit, a programmable processor, a microcontroller, a digital signal processor, etc. The physical device may be adapted to provide the functionality of the hypervisor (220) described throughout this application.

Alternatively, in one or more of embodiments of the invention, similar to the VMs (210), the hypervisor (220) may also be implemented as computer instructions, as discussed above.

In one or more embodiments of the invention, the production agent (230) may be configured to locally orchestrate the performance of backup services for the VMs (210). More specifically, the production agent (230) may orchestrate the performance of the backup services under the direction of the remote agents (e.g., 110, FIG. 1). For example, the remote agents (e.g., 110, FIG. 1) may send instructions to the production agent (230) regarding: (i) when one or more backups of the VMs (210) should be generated; (ii) where the generated backup(s) should be stored; and (iii) when a VM should be restored to a previous state. Other instructions not listed above may also be sent without departing from the scope of the invention.

To orchestrate the performance of the backup services, the production agent (230) may issue commands to the hypervisor (220) to control the operation of the VMs (210) when a backup of one of the VMs (210) is being generated, or when a restoration of one of the VMs (210) is being performed.

In one or more embodiments of the invention, the production agent (230) may be a hardened entity, i.e., not modifiable by an entity that is remote to the production host (200) on which the production agent (230) is executing. In one or more embodiments, the production agent (230) may have a set of predefined functions that may be invoked by a remote entity. In one or more embodiments, the production agent (230) may not be configurable by modifying settings or associated configuration files by the remote entity.

In one or more embodiments of the invention, the production agent (230) may be implemented as computer instructions, e.g., computer code, stored on the persistent storage (240) that when executed by a processor of the production host (200) cause the production host (200) to provide the functionality of the production agent (230) described throughout the application.

Alternatively, in one or more embodiments of the invention, similar to the hypervisor (220), the production agent (230) may also be a physical device including circuitry, as discussed above.

In one or more embodiments of the invention, the persistent storage (240) may be a physical computer readable storage medium. Details regarding the persistent storage are described above in reference to FIG. 1.

Figure 3:
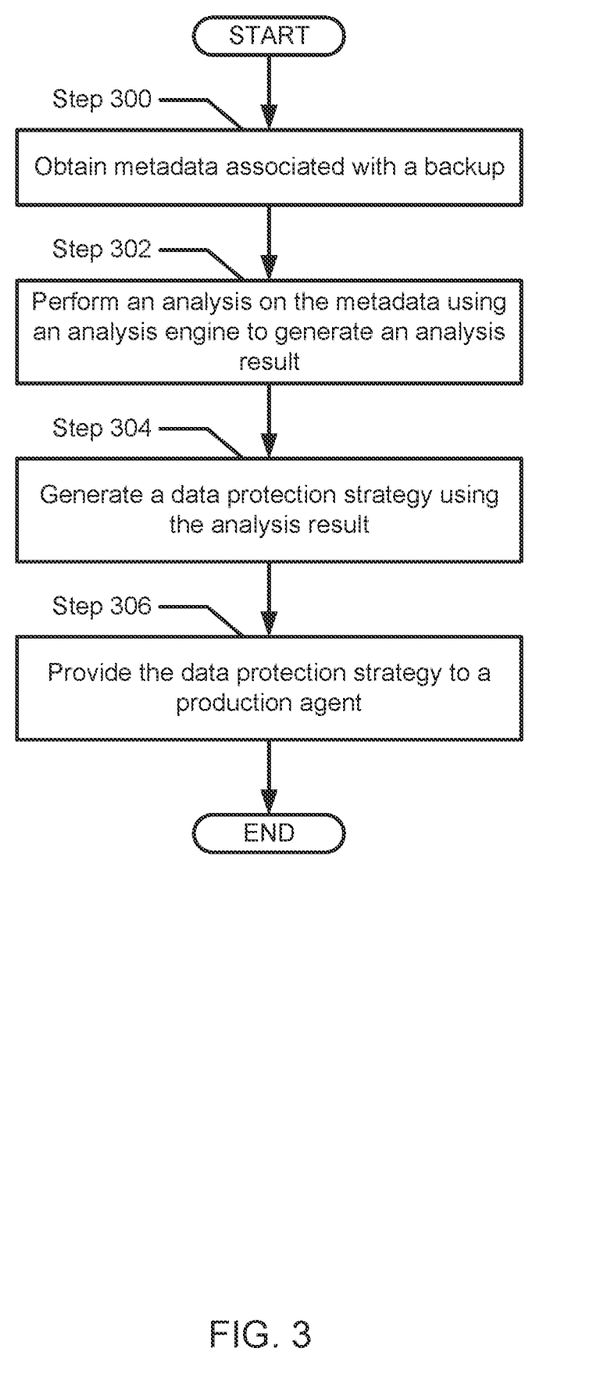
FIG. 3 shows a method for generating and implementing a data protection strategy in accordance with one or more embodiments of the invention.

FIG. 3 shows a method for generating and implementing a data protection strategy in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3, the method shown in FIG. 3 may be performed by, for example, the above-discussed remote agents (e.g., 110, FIG. 1) and analysis agent. Other components of the system (e.g., 100, FIG. 1) illustrated in FIG. 1 may also contribute to the performance of the method shown in FIG. 3 without departing from the scope of the invention.

In Step 300, metadata associated with a backup (e.g., backup metadata) is obtained. In addition, application metadata may also be obtained (sequentially or concurrently) with the backup metadata. Details regarding the backup metadata and the application metadata are described above in reference to FIG. 1.

In Step 302, an analysis is performed on the obtained backup metadata and application metadata using an analysis engine (as discussed above in reference to FIG. 1) to generate one or more analysis results. The one or more analysis results may include a data protection effectiveness analysis result, a root cause analysis result, and an exposure analysis results (as discussed above in reference to FIG. 1). Recommendations (as discussed above in reference to FIG. 1) may then be generated to help users fix issues specified in the one or more analysis results. The analysis agent may then send the one or more analysis results and the associated recommendations to the remote agents.

In Step 304, one or more data protection strategies may be generated using one or more of the analysis results and the associated recommendations. Before the analysis is performed in Step 302, an existing data protection strategy may recommend a user to, for example: (i) obtain VM data from the production hosts (e.g., 130, FIG. 1); (ii) select a backup window (e.g., 48 hours for a full backup and 12 hours for an incremental backup); (iii) select a backup schedule (e.g., every week for a full backup and every day for an incremental backup); (iv) select a 4-hour RPO for the VM data; (v) select a 500 GB backup storage from the backup storages (e.g., 120, FIG. 1); (vi) initiate the backup; (vii) set a backup retention time (e.g., an amount of time the backup should be kept in a backup storage) to 3 months, etc.

In one or more embodiments, after executing the analysis in Step 302, the one or more data protection strategies generated in Step 304 may specify a user to, for example: (i) obtain VM data from the production hosts (e.g., 130, FIG. 1); (ii) select a backup window (e.g., 96 hours for a full backup and 3 hours for an incremental backup); (iii) select a backup schedule (e.g., every month for a full backup and 6 hours for an incremental backup); (iv) select a 3-hour RPO for the VM data; (v) select a 1 TB backup storage from the backup storages (e.g., 120, FIG. 1); (vi) store static VM data to an archive location; (vii) initiate the backup; (viii) set the backup retention time to 6 months, etc.

In Step 306, the one or more data protection strategies generated in Step 304 are provided to a production agent. The production agent (e.g., 230, FIG. 2) may then store the received data protection strategies into persistent storage (e.g., 240, FIG. 2) and perform one or more subsequent backups using one or more of the data protection strategies. The remote agents may also provide the one or more data protection strategies generated in Step 304 to the clients (e.g., 140, FIG. 1) and notify the clients about each of the associated recommendations.

In one or more embodiments of the invention, the method may end following Step 306.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN), such as the Internet, mobile network, or any other type of network) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data protection, the method comprising:
   obtaining metadata associated with a backup from a backup storage;
   performing an analysis on the metadata using an analysis engine to generate an analysis result, wherein the analysis engine comprises a root cause analyzer, wherein the root cause analyzer performs a pre-protection process and a post-protection process to determine issues related to the backup,
      wherein the backup storage and the analysis engine are operably connected to each other over a combination of wired and wireless connections,
      wherein the backup storage is a first computing device (CD) that comprises at least a first integrated circuitry (IC) that provides services to a production agent,
      wherein the analysis engine is a second CD that further comprises at least a second IC that provides second services to the backup storage;
   generating a data protection strategy using the analysis result, wherein the data protection strategy specifies a user's recovery point objective that is set for data; and
   providing the data protection strategy to the production agent.

2. The method of claim 1, wherein the analysis engine further comprises an exposure analyzer, wherein the exposure analyzer determines at least a portion of the data on a production host associated with the backup that is not protected.

3. The method of claim 2,
   wherein the analysis result specifies at least the portion of data that is not protected, and
   wherein the data protection strategy further specifies how to protect at least the portion of data that is not protected.

4. The method of claim 1,
   wherein the pre-protection process comprises determining whether the backup storage have sufficient capacity to store the backup,
   wherein the post-protection process comprises determining whether that a backup window was exceeded during generation of the backup.

5. The method of claim 1, wherein the analysis result specifies a recommendation to address at least one error associated with the backup.

6. The method of claim 1, wherein the analysis engine further comprises a data protection effectiveness analyzer, wherein the data protection effectiveness analyzer determines effectiveness of the backup.

7. The method of claim 6,
   wherein the analysis result identifies at least a portion of files on a production host associated with the backup that do not frequently change,
   wherein the data protection strategy further specifies moving at least the portion of the files to an archive location.

8. A non-transitory computer readable medium comprising computer readable program code, which when executed by a computer processor enables the computer processor to perform a method for managing data protection, the method comprising:
   obtaining metadata associated with a backup from a backup storage;

performing an analysis on the metadata using an analysis engine to generate an analysis result, wherein the analysis engine comprises a data protection effectiveness analyzer,
- wherein the data protection effectiveness analyzer determines effectiveness of the backup,
- wherein the backup storage and the analysis engine are operably connected to each other over a combination of wired and wireless connections,
- wherein the backup storage is a first computing device (CD) that comprises at least a first integrated circuitry (IC) that provides services to a production agent,
- wherein the analysis engine is a second CD that further comprises at least a second IC that provides second services to the backup storage;

generating a data protection strategy using the analysis result,
- wherein the analysis result identifies at least a portion of files on a production host associated with the backup that do not frequently change,
- wherein the data protection strategy specifies moving at least the portion of the files to an archive location, and
- wherein the data protection strategy specifies a user's recovery point objective that is set for data; and providing the data protection strategy to the production agent.

9. The non-transitory computer readable medium of claim 8, wherein the analysis engine further comprises an exposure analyzer, wherein the exposure analyzer determines at least a portion of the data on a second production host associated with the backup that is not protected.

10. The non-transitory computer readable medium of claim 9,
- wherein the analysis result specifies at least the portion of data that is not protected, and
- wherein the data protection strategy further specifies how to protect at least the portion of data that is not protected.

11. The non-transitory computer readable medium of claim 8, wherein the analysis engine further comprises a root cause analyzer, wherein the root cause analyzer performs a pre-protection process and a post-protection process to determine issues related to the backup.

12. The non-transitory computer readable medium of claim 11,
- wherein the pre-protection process comprises determining whether the backup storage have sufficient capacity to store the backup,
- wherein the post-protection process comprises determining whether that a backup window was exceeded during generation of the backup.

13. The non-transitory computer readable medium of claim 11, wherein the analysis result specifies a recommendation to address at least one error associated with the backup.

14. A system for managing data protection, the system comprising:
- a processor comprising circuitry;
- memory comprising instructions, which when executed perform a method, the method comprising:
  - obtaining metadata associated with a backup from a backup storage;
  - performing an analysis on the metadata using an analysis engine to generate an analysis result, wherein the analysis engine comprises a root cause analyzer,
    - wherein the root cause analyzer performs a pre-protection process and a post-protection process to determine issues related to the backup,
    - wherein the backup storage and the analysis engine are operably connected to each other over a combination of wired and wireless connections,
    - wherein the backup storage is a first computing device (CD) that comprises at least a first integrated circuitry (IC) that provides services to a production agent,
    - wherein the analysis engine is a second CD that further comprises at least a second IC that provides second services to the backup storage;
  - generating a data protection strategy using the analysis result, wherein the data protection strategy specifies a user's recovery point objective that is set for data; and
  - providing the data protection strategy to the production agent.

15. The system of claim 14, wherein the analysis engine further comprises an exposure analyzer, wherein the exposure analyzer determines at least a portion of the data on a production host associated with the backup that is not protected.

16. The system of claim 15,
- wherein the analysis result specifies at least the portion of data that is not protected, and
- wherein the data protection strategy further specifies how to protect at least the portion of data that is not protected.

* * * * *